(12) United States Patent
Cote

(10) Patent No.: US 10,455,818 B2
(45) Date of Patent: Oct. 29, 2019

(54) BIRD FEEDER

(71) Applicant: Paul L. Cote, Knowlton (CA)

(72) Inventor: Paul L. Cote, Knowlton (CA)

(*) Notice: Subject to any disclaimer, the term of this patent is extended or adjusted under 35 U.S.C. 154(b) by 224 days.

(21) Appl. No.: 15/164,181

(22) Filed: May 25, 2016

(65) Prior Publication Data

US 2017/0339926 A1   Nov. 30, 2017

(51) Int. Cl.
*A01K 39/01*   (2006.01)
*A01K 39/012*   (2006.01)

(52) U.S. Cl.
CPC ........ *A01K 39/0113* (2013.01); *A01K 39/012* (2013.01)

(58) Field of Classification Search
CPC .............................. A01K 39/01; A01K 39/0113
USPC ........... 119/52.1, 52.2, 52.3, 52.4, 57.8, 57.9
See application file for complete search history.

(56) References Cited

U.S. PATENT DOCUMENTS

| | | | | |
|---|---|---|---|---|
| 3,145,690 A | * | 8/1964 | Bachman | A01K 39/0113 |
| | | | | 119/52.3 |
| 3,241,525 A | | 3/1966 | Meier | |
| 5,195,460 A | * | 3/1993 | Loken | A01K 39/0113 |
| | | | | 119/57.9 |
| 5,207,181 A | * | 5/1993 | Loken | A01K 39/0113 |
| | | | | 119/57.9 |
| 5,289,796 A | * | 3/1994 | Armstrong | A01K 39/012 |
| | | | | 119/52.3 |
| 5,445,109 A | | 8/1995 | Gray et al. | |
| 6,561,128 B1 | * | 5/2003 | Carter | A01K 39/0113 |
| | | | | 119/52.3 |
| 6,918,353 B1 | * | 7/2005 | Coroneos | A01K 39/0113 |
| | | | | 119/52.3 |
| 6,945,192 B2 | | 9/2005 | Cote | |
| 7,739,982 B2 | | 6/2010 | Cote | |
| 2003/0033985 A1 | * | 2/2003 | Hardison | A01K 39/00 |
| | | | | 119/57.9 |
| 2005/0268858 A1 | * | 12/2005 | Zieff | A01K 39/0113 |
| | | | | 119/52.2 |
| 2006/0162665 A1 | * | 7/2006 | George | A01K 39/0113 |
| | | | | 119/52.3 |
| 2008/0295777 A1 | * | 12/2008 | Cote | A01K 39/0113 |
| | | | | 119/52.3 |
| 2011/0083610 A1 | * | 4/2011 | Cote | A01K 39/0113 |
| | | | | 119/52.3 |

(Continued)

*Primary Examiner* — Tien Q Dinh
*Assistant Examiner* — Brady W Frazier
(74) *Attorney, Agent, or Firm* — Dennis L. Thomte; Thomte Patent Law Office LLC

(57) ABSTRACT

A bird feeder including a shroud embracing a vertically disposed feed container with the feed container having a feed tray at the lower end thereof. The shroud is vertically movable between an upper position and a lower position with respect to the feed container. In its upper position, birds are able to gain access to the feed tray. In its lower position, the shroud blocks access to the feed tray. A spring yieldably maintains the shroud in its upper position. If a squirrel climbs onto the shroud, the weight of the squirrel overcomes the resistance of the spring which results in the shroud moving to its lower position to prevent the squirrel from gaining access to the feed tray. Three different embodiments of the spring are described and shown. The design of the cover of the shroud partially shields the spring from inclement weather.

1 Claim, 18 Drawing Sheets

(56) References Cited

U.S. PATENT DOCUMENTS

2015/0305311 A1\* 10/2015 Murray ................ A01K 39/012
                                                                                      119/57.9

\* cited by examiner

BIRD FEEDER

BACKGROUND OF THE INVENTION

Field of the Invention

This invention relates to a bird feeder and more particularly relates to a bird feeder which prevents large birds and other animals, such as squirrels, from obtaining feed therefrom.

Description of the Related Art

Selective bird feeders are well known in the art and are designed to limit the maximum size of a bird or animal which can access the seed in the feeder. The reasons for excluding certain birds may be many. Thus, as disclosed in U.S. Pat. No. 3,241,525, there is provided a selective bird feeder which is specific to cardinals. As taught by this patent, a favorite seed of cardinals is a sunflower seed; this seed is also popular with both smaller and larger birds.

Some larger birds will also access the seed within a bird feeder and many such birds, such as crows, grackles, blue jays and the like are considered by some people to be undesirable.

A further problem associated with bird feeders is marauders which gain access to the seeds. In particular, squirrels are well known for their ability to reach the seed in a bird feeder and to devour the same. Many approaches have been tried to discourage or prevent squirrels from reaching the bird feeder, including various types of covers and baffles on poles. These seldom work as squirrels have shown great ingenuity in overcoming such devices.

There are also many proposals in the art for squirrel-proof bird feeders which utilize a shroud to cover openings in the side wall of a seed container. The shroud is biased to a first upper position, usually by a spring member, such that when weight is placed on the shroud, it moves downwardly to cover the feed openings. Thus, reference may be had to U.S. Pat. Nos. 5,445,109 and 6,945,192 which disclose such arrangements.

While such shroud type squirrel proof bird feeders are useful, they are relatively costly to manufacture and assemble due to different requirements such as maintaining the openings in the shroud and openings in the side wall of the seed container in alignment. One must also take into account inclement weather which can affect the functioning of the bird feeder.

A distinct improvement in the prior art is shown in Applicant's U.S. Pat. No. 7,739,982 B2. A further improvement in the art is provided with the instant application wherein three different types of springs are disclosed for yieldably maintaining the shroud of the bird feeder to a first upper position. When weight is placed on the shroud, it moves downwardly to cover the feed openings of the feed tray. More particularly, the instant invention relates to a bird feeder wherein the springs thereof are shielded from inclement weather.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Three different embodiments of a squirrel resistant bird feeder are disclosed. In the first embodiment, the bird feeder includes a vertically disposed and hollow cylindrical feed container having an open upper end and an open lower end. A feed tray is mounted to the feed container at the lower end thereof which is configured to receive feed from the feed container. The upper end of the feed container has a feed inlet structure positioned in the open upper end of the feed container. The feed inlet structure may be integrally molded with the feed container or maybe inserted therein. The feed inlet structure has a plurality of feed openings formed therein which are configured to permit feed to pass downwardly therethrough into the feed container. A vertically disposed hanger rod has its lower end secured to the feed inlet structure and extends upwardly therefrom.

The bird feeder also includes a vertically disposed cylindrical and mesh shroud having upper and lower ends. A plate is secured to the upper end of the shroud so as to extend over the upper end of the shroud. The plate has a central opening formed therein. The shroud also has a plurality of perches secured thereto at its lower end. The shroud encloses the feed container and the feed tray. The shroud has a ring-shaped wall member secured thereto which extends around the shroud above the lower end thereof. The shroud also includes a generally cone-shaped cover which is fixedly secured to the upper end of the shroud. The cover includes an outer lower end which has a diameter greater than the diameter of the shroud. The cover also has a central opening formed therein.

The hanger rod extends upwardly through the central opening in the plate and the central opening in the cover whereby the upper end of the hanger rod is positioned above the cover. The upper end of the hanger rod is configured to be operatively secured to an overhead support.

The shroud is vertically movable between an upper position and a lower position with respect to the feed container. The bird feeder also includes a coil spring having upper and lower ends with the coil spring being positioned between the feed inlet structure and the plate. The lower end of the coil spring is in engagement with the upper end of the feed inlet structure and the upper end of the coil spring is in engagement with the lower side of the plate. The coil spring yieldably maintains the shroud in its upper position with respect to the feed container. The shroud is movable from its upper position to its lower position upon a squirrel climbing onto the shroud or perches thereon whereby the weight of the squirrel overcomes the yieldable resistance of the spring to permit the shroud to move to its lower position. The ring-shaped wall member on the shroud is positioned outwardly of the feed tray, when the shroud is in its lower position, to deny access to the feed tray.

The cover and the feed inlet structure are configured to partially shield the coil spring from inclement weather when the shroud is in its upper position. The cover and the feed inlet structure completely shield the coil spring when the shroud is in its lower position.

Second and third embodiments of the bird feeder are also described with the second and third embodiments having different types of springs for yieldably maintaining the shroud in its upper position.

It is therefore a principal object of the invention to provide an improved squirrel resistant bird feeder.

A further object of the invention is to provide a squirrel resistant bird feeder having a spring located between the upper end of the feed container and the lower end of a plate which is secured to the upper end of the shroud and with a spring being positioned between the upper end of the feed container and the upper end of the shroud.

A further object of the invention is to provide a means for shielding the spring which yieldably urges the shroud to its upper position.

A further object of the invention is to provide a bird feeder which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
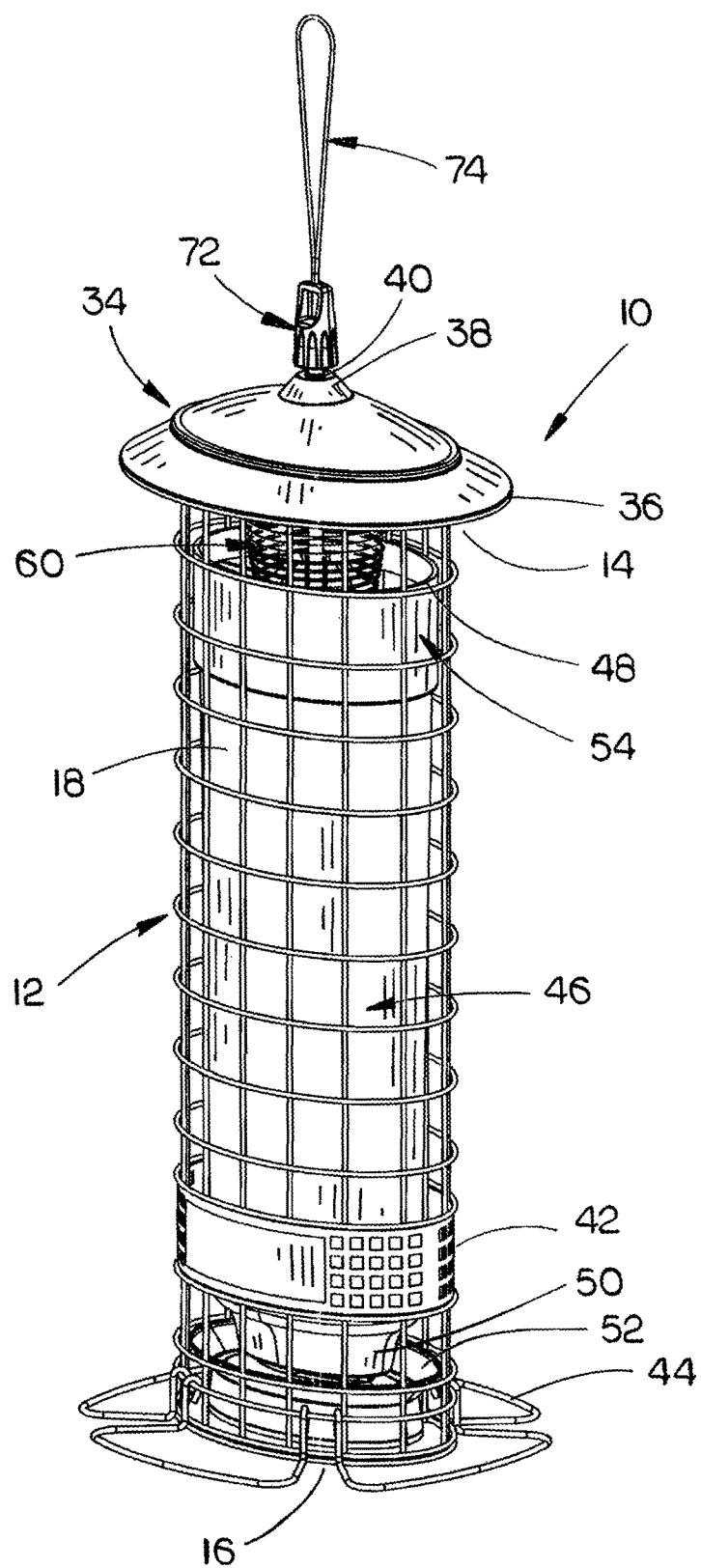
FIG. 1 is a perspective view of the first embodiment of the bird feeder of this invention with the shroud thereof being in its upper position with respect to the feed container thereof so that birds have access to the feed in the feed tray at the lower end of the feed container of the bird feeder.
Figure 2:
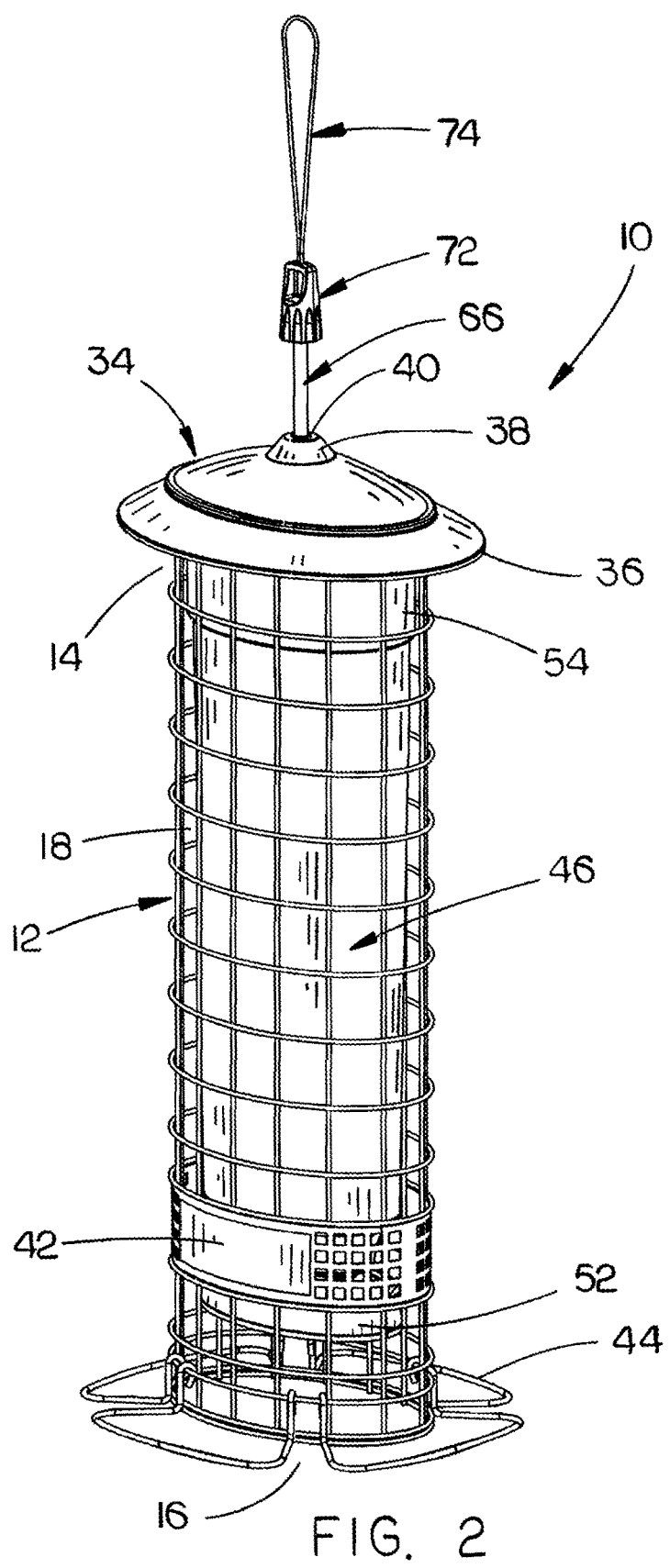
FIG. 2 is a perspective view of the bird feeder of FIG. 1 wherein the shroud thereof has been lowered to shield the feed tray thereof so that large birds or squirrels are denied access to the feed in the feed tray.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the first embodiment of the squirrel-proof feeder of this invention which is illustrated in FIGS. 1-6. Bird feeder 10 includes a vertically disposed shroud 12 having an upper end 14 and a lower end 16. Shroud 12 is comprised of a mesh material having a plurality of openings 18 formed therein. A ring-shaped wall member 20 embraces the upper end of shroud 12 and is secured thereto by welding or any other convenient means and extends therearound as seen in the drawings. The upper end of wall member 20 has a pair of tabs 22 and 24 which extend horizontally inwardly from wall member 20 and which have screw openings 26 and 28 formed therein respectively. A horizontally disposed plate 30 is secured to the undersides of tabs 22 and 24 and extends therebetween. Screws secure the ends of plate 30 to the tabs 22 and 24. Plate 30 has a central opening 32 formed therein. As will be explained hereinafter, the plate 30 may be omitted in some cases.

The numeral 34 refers to a cover which is secured to the upper end 14 of shroud 12 and/or the upper end of wall member 20 by welding or the like. In the preferred embodiment, cover 34 is somewhat cone-shaped and has its lower outer end 36 positioned outwardly of wall member 20 and the upper end of shroud 12 and below the upper end of wall member 20 so as to shield the upper end of the shroud 12 as will be explained in more detail hereinafter. Cover 34 has a frusto-conical shaped member 38 at its upper end with the member 38 having an opening 40 formed therein. Although it is preferred that cover 34 is generally cone-shaped, cover 34 may be flat as long as it has a sufficient diameter to partially shield the spring associated therewith which will be explained in more detail hereinafter.

Shroud 12 has a ring-shaped wall member 42 secured thereto by welding or any other convenient means. As seen, wall member 42 embraces shroud 12 above the lower end 16 of shroud 12. Wall member 42 could be replaced by a plurality of closely spaced wires extending around shroud 12. The lower end of shroud 12 has a plurality of radially spaced-apart perches 44 pivotally secured thereto. The perches 44 may not be pivotally secured to the lower end of shroud 12 but could be non-pivotal as well.

The numeral 46 refers to a vertically disposed and cylindrical feed container which is preferably transparent and which has an upper end 48 and an inwardly tapered and open lower end 50. As seen, feed container 46 is positioned within shroud. A ring-shaped feed tray 52 is secured to the lower end 50 of feed container 46 by any convenient means. Feed tray 52 is configured to receive bird feed from the open lower end 50 of container 46 in conventional fashion. The outer end of feed tray 52 is positioned inwardly of the inside of shroud 12. As will be explained hereinafter, shroud 12 is vertically movable with respect to container 46 between upper and lower positions.

In the preferred embodiment, a portion of feed inlet plug 54 embraces the upper end of container 46. Feed inlet plug 54 includes a feed inlet structure 55 which is positioned within the upper end of feed container 46. Feed inlet structure 55 has a plurality of feed inlet openings 56 formed therein to permit feed to pass downwardly therethrough to permit the feed container 46 to be filled with feed. Feed inlet structure 55 has a plurality of radially spaced-apart tapered shoulders 58 extending upwardly therefrom. Although it is preferred that the feed inlet plug 54 is a separate component which is attached to the upper end of the feed container 46, the feed inlet structure 55 of feed inlet plug 54 could be integrally molded with feed container 46. In that case, the outer portion of plug 46 is not needed. The numeral 60 refers to a coil spring or torsion spring having an upper end 62 and a lower end 64. As seen, the lower end 64 of spring 60 extends around the shoulders 58 and engages the upper side of feed inlet structure 55. The upper end 62 of spring 60 engages the underside of plate 30. The spring 60 yieldably urges shroud 12 upwardly to its upper position with respect to container 46 as will be described in more detail hereinafter. If the plate 30 is omitted and the cover 34 is flat, the upper end of spring 60 will engage the underside of the cover 34.

The numeral 66 refers to a vertically disposed hanger rod having an upper end 68 and a lower end 70. The lower end 70 of rod 66 is secured to feed inlet structure 55 by any convenient means. Rod 66 extends upwardly from feed inlet structure 55, through spring 60, through opening 32 in plate 30, and through opening 40 in member 38. A hanger support 72 is threadably secured to the upper end 68 of rod 66. A hanger loop 74 or other hanger device is secured to hanger support 72 for supporting the bird feeder 10 from some overhead supporting structure such as a tree, pole, etc. Although it is preferred that member 66 be a rod, member 66 could be a cable or other like member.

When it is desired to first place the bird feeder 10 into operation or to re-fill the feed container 46 with bird feed, the bird feeder 10 is placed upon a horizontal support surface such as the ground. The fitting 72 is then threadably disconnected from the upper end 68 of rod 66.

The shroud 12 and the cover 34, which is attached to shroud 12, are then moved upwardly with respect to feed container 46 and removed therefrom. Bird feed is then poured into the feed container 46 by way of the feed inlet structure 55. The bird feed passes downwardly through the feed openings 56 in feed inlet structure 55 into the interior of feed container 46 until the feed tray 52 and the feed container 46 are filled.

The shroud 12, with attached cover 34, is then lowered onto the feed container 46 with the rod 66 extending upwardly through spring 60, through opening 32 in plate 30 and through opening 40 in member 38. The fitting 72 is then threadably secured to the upper end of rod 66. The bird feeder 10 is then hung from an overhead support such as a tree, pole, etc.

Figure 3:
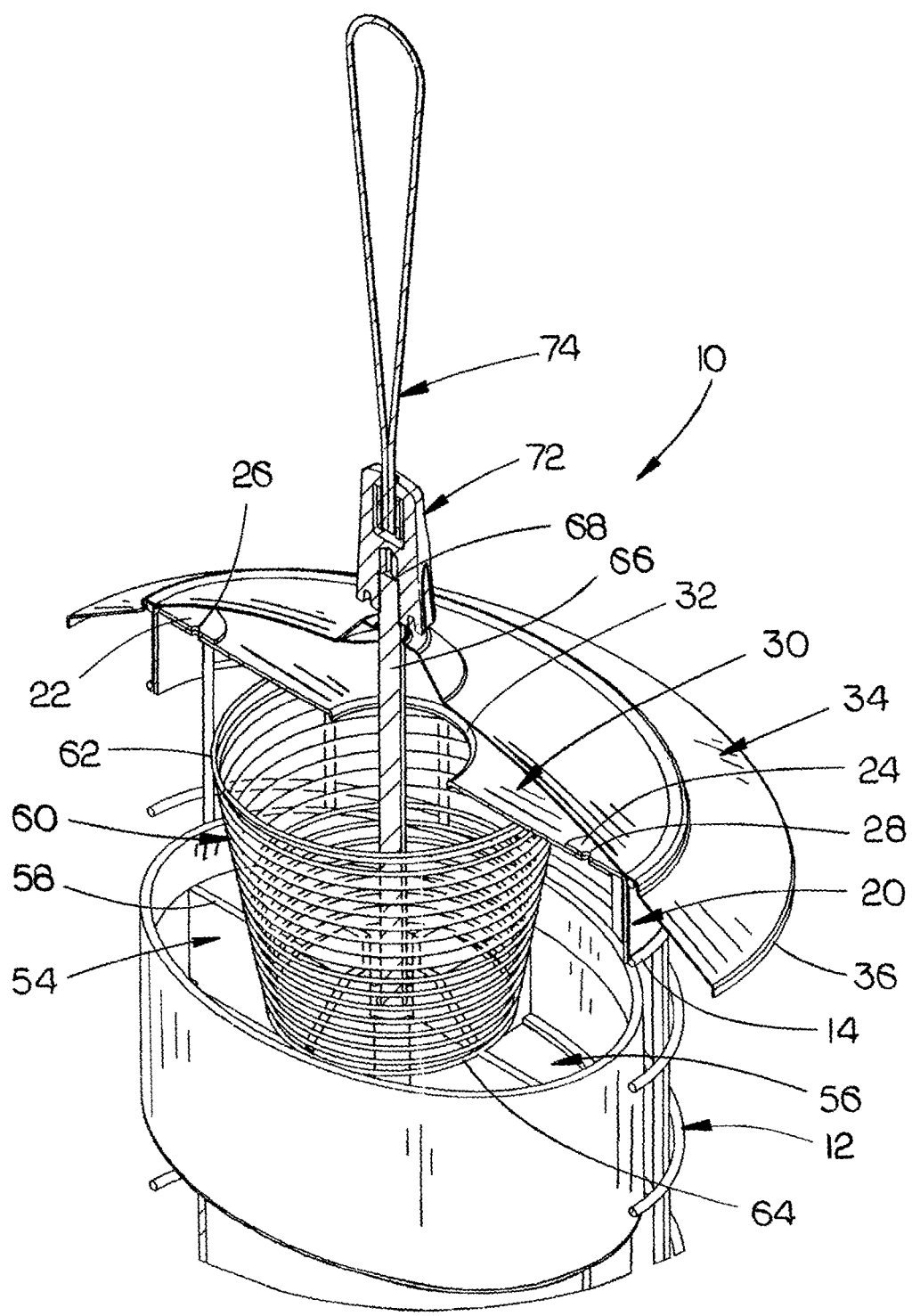
FIG. 3 is a partial upper perspective view of the bird feeder of FIG. 1 with portions thereof being cut-away to more fully illustrate the invention with the shroud thereof being in its upper position with respect to the feed container thereof.
Figure 4:
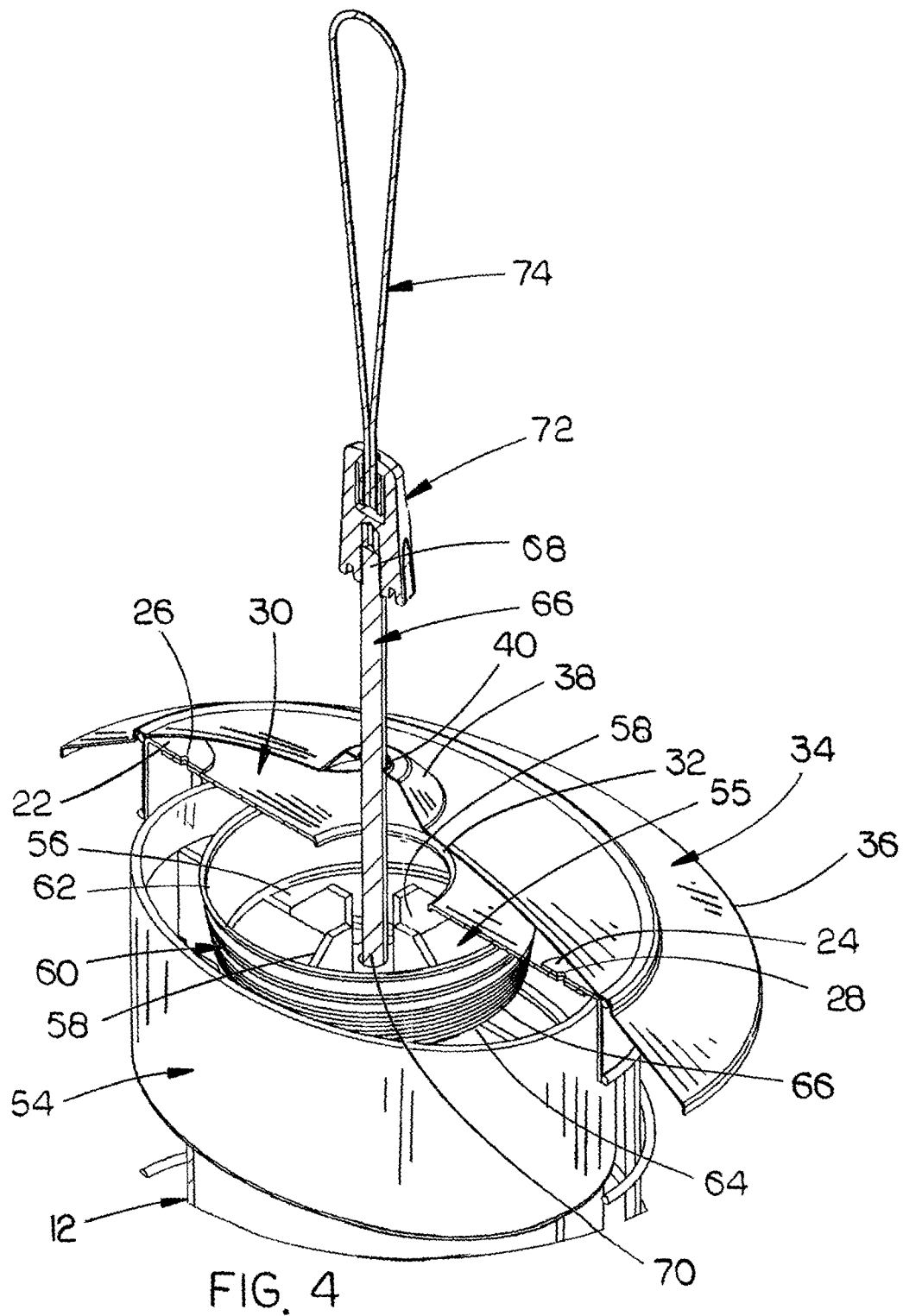
FIG. 4 is a partial upper perspective view of the bird feeder of FIG. 1 with portions thereof cut-away to more fully illustrate the invention with the shroud thereof being in its lower position with respect to the feed container thereof.
Figure 5:
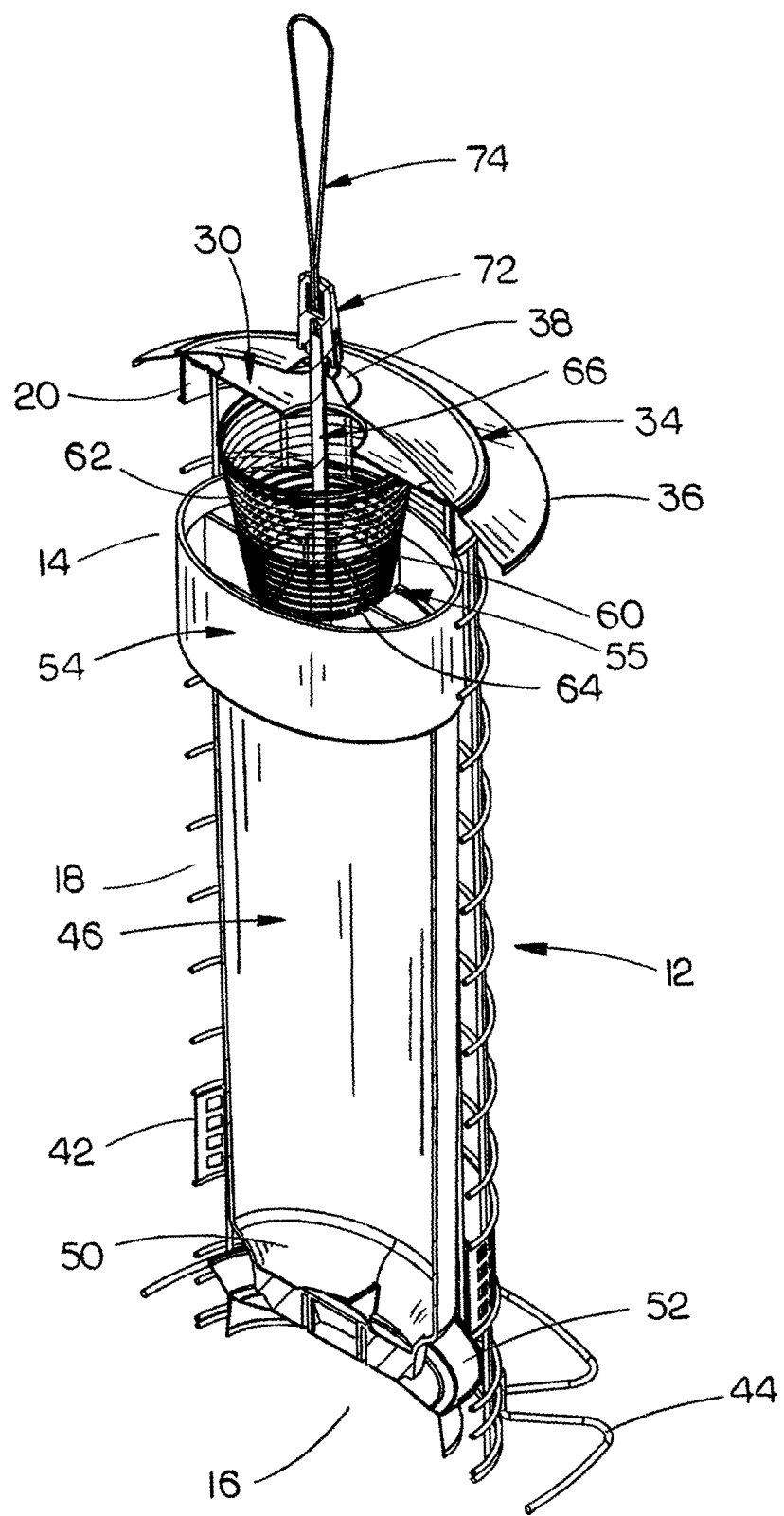
FIG. 5 is a partial perspective view of the bird feeder of FIG. 1 with portions thereof being cut-away to more fully illustrate the invention with the shroud thereof being in its upper position with respect to the feed container thereof.
Figure 6:
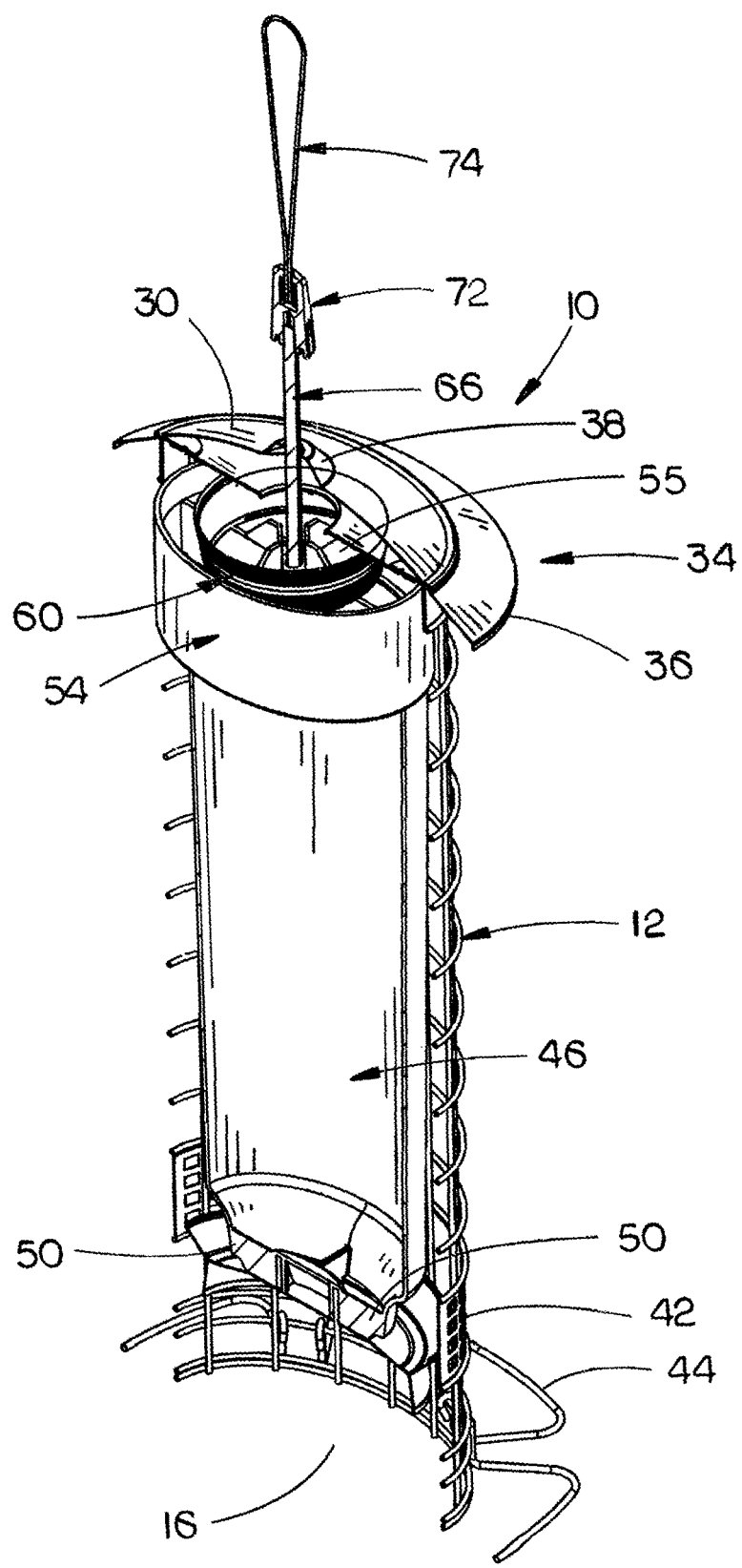
FIG. 6 is a partial perspective view of the bird feeder of FIG. 1 with portions thereof being cut-away to more fully illustrate the invention with the shroud thereof being in its lower position with respect to feed container thereof.

When the seed container 46 is filled with bird feed and the feeder is hung from a support, the spring 60 will yieldably maintain shroud 12 in its upper position with respect to container 46 as seen in FIGS. 1 and 3. When the shroud 12 is in its upper position, the wall member 42 or other structure will be positioned above the openings 18 of shroud 12 which are outwardly of the feed tray 52 so that birds may perch on the perches 44 and have access to the feed in the feed tray 52. If a squirrel moves onto the shroud 12 or onto the perches 44, the weight of the squirrel overcomes the upward force of spring 60 which causes shroud 12 to move downwardly to its lower position with respect to container 46. The downward movement of shroud 12 to its lower position with respect to container 46 causes wall member 42 to be positioned outwardly of feed tray 52 thereby preventing the squirrel from having access to the feed in the feed tray 52. The design of the cover 34 partially shields the spring 60 somewhat to protect the spring 60 from inclement weather when the shroud is in its upper position.

The numeral 110 refers to the second embodiment of the squirrel-proof feeder of this invention. As seen in FIGS. 7-12, bird feeder 110 is essentially the same as bird feeder 10 except for the spring which yieldably maintains the shroud thereof in its upper position with respect to the feed container as will be described hereinafter. Bird feeder 110 includes a vertically disposed shroud 112 having an upper end 114 and a lower end 116. Shroud 112 is comprised of a mesh material having a plurality of opening 118 formed therein. A ring-shaped wall member 120 embraces the upper end of shroud 112 and is secured thereto by welding or any other convenient means and extends therearound as seen in the drawings. The upper end of wall member 120 has a pair of tabs 122 and 124 which extend horizontally inwardly from wall member 120 and which have screw openings 126 and 128 formed therein respectively. A horizontally disposed plate 130 is secured to the undersides of tabs 122 and 124 and extends therebetween. Screws secure the ends of plate 130 to the tabs 122 and 124. Plate 130 has a central opening 132 formed therein. As stated above with respect to the plate 30, the plate 130 may be omitted if the cover thereof is flat.

The numeral 134 refers to a cover which is secured to the upper end 114 of shroud 112 and/or the upper end of wall member 120 by welding or the like. Cover 134 is somewhat cone-shaped and has its lower outer end 136 positioned outwardly of wall member 120 and the upper end of shroud 112 below the upper end of wall member 120 so as to shield the upper end of the shroud 112 and the spring therein.

Although it is preferred that cover 134 is generally cone-shaped, cover 134 may be flat as long as it has a sufficient diameter to partially shield the spring associated therewith which will be explained in more detail hereinafter. Cover 134 has a frusto-conical shaped member 138 at its upper end with the member 138 having an opening 140 formed therein.

Shroud 112 has a ring-shaped wall member 142 secured thereto by welding or any other convenient means. As seen, wall member 142 embraces shroud 112 above the lower end 116 of shroud 112. As stated above, wall member 142 could be replaced by a plurality of closely spaced-apart wires extending around shroud 112. The lower end of shroud 112 has a plurality of radially spaced-apart perches 144 pivotally secured thereto.

The numeral 146 refers to a vertically disposed and cylindrical feed container which is preferably transparent and which has an upper end 148 and an inwardly tapered and open lower end 150. As seen, feed container 146 is positioned within shroud 112. A ring-shaped feed tray 152 is secured to the lower end 150 of container 146 by any convenient means. Feed tray 152 is configured to receive bird feed from the open lower end 150 of container 146 in conventional fashion. The outer end of feed tray 152 is positioned inwardly of the inside of shroud 112. As will be explained hereinafter, shroud 112 is vertically movable with respect to container 146 between upper and lower positions.

A feed inlet plug 154 has an outer portion which embraces the upper end of container 14. Feed inlet plug 154 includes a feed inlet structure 155 which is positioned within the upper end of feed container 146. Feed inlet structure 155 has a plurality of feed inlet openings 156 formed therein to permit feed to pass downwardly therethrough to permit the feed container 146 to be filled with feed. Feed inlet structure 155 also has a plurality of radially spaced-apart shoulders 158 extending upwardly therefrom. Although it is preferred that the feed inlet plug 154 is a separate component which is attached to the upper end of the feed container 146, the feed inlet structure 155 of feed inlet plug 154 could be integrally molded with feed container 146. In that case, the outer portion of feed inlet plug 154 is not needed. The numeral 160 refers to a spring assembly as will be described in more detail hereinafter. The spring assembly 160 yieldably urges shroud 112 upwardly to its upper position with respect to container 146 as will be described in more detail hereinafter.

The numeral 166 refers to a vertically disposed rod having an upper end 168 and a lower end 170. The lower end 170 of rod 166 is secured to feed inlet structure 155. Rod 166 extends upwardly from feed inlet structure 155, through spring assembly 160, through opening 132 in plate 130, and through opening 140 in member 138. A hanger support 172 is threadably secured to the upper end 168 of rod 166. A hanger loop 174 or other hanger device is secured to hanger support 172 for supporting the feeder 110 from some overhead supporting structure such as a tree, pole, etc. Although it is preferred that member 166 be a rod, member 166 could be a cable or other like member.

When it is desired to first place the bird feeder 110 into operation or to re-fill the feed container 146 with bird feed, the bird feeder 110 is placed upon a horizontal surface such as the ground. The fitting 172 is then threadably disconnected from the upper end of rod 166. The shroud 112 and the cover 134, which is attached to shroud 112, are then moved upwardly with respect to feed container 146 and removed therefrom. Bird feed is then poured into the feed container 146 by way of the feed inlet structure 155. The bird feed passes downwardly through the feed openings 156 in feed inlet structure 155, into the feed container 146.

When the seed container 146 is filled with bird feed and the feeder is hung from an overhead support, the spring assembly 160 will yieldably maintain shroud 112 in its upper position with respect to feed container 146. When the shroud 112 is in its upper position, the wall member 142 will be positioned above the openings 118 of shroud 112 which are outwardly of the feed tray 152 so that birds may perch on the perches 144 and have access to the feed in the feed tray 152. If a squirrel moves onto the shroud 112 or the perches 144, the weight of the squirrel overcomes the upward force of spring assembly 160 which causes shroud 112 to move downwardly with respect to container 146. The downward movement of shroud 112 with respect to container 146 causes wall member 142 to be positioned outwardly of feed tray 152 thereby preventing access to the feed in the feed tray 152.

Figure 9:
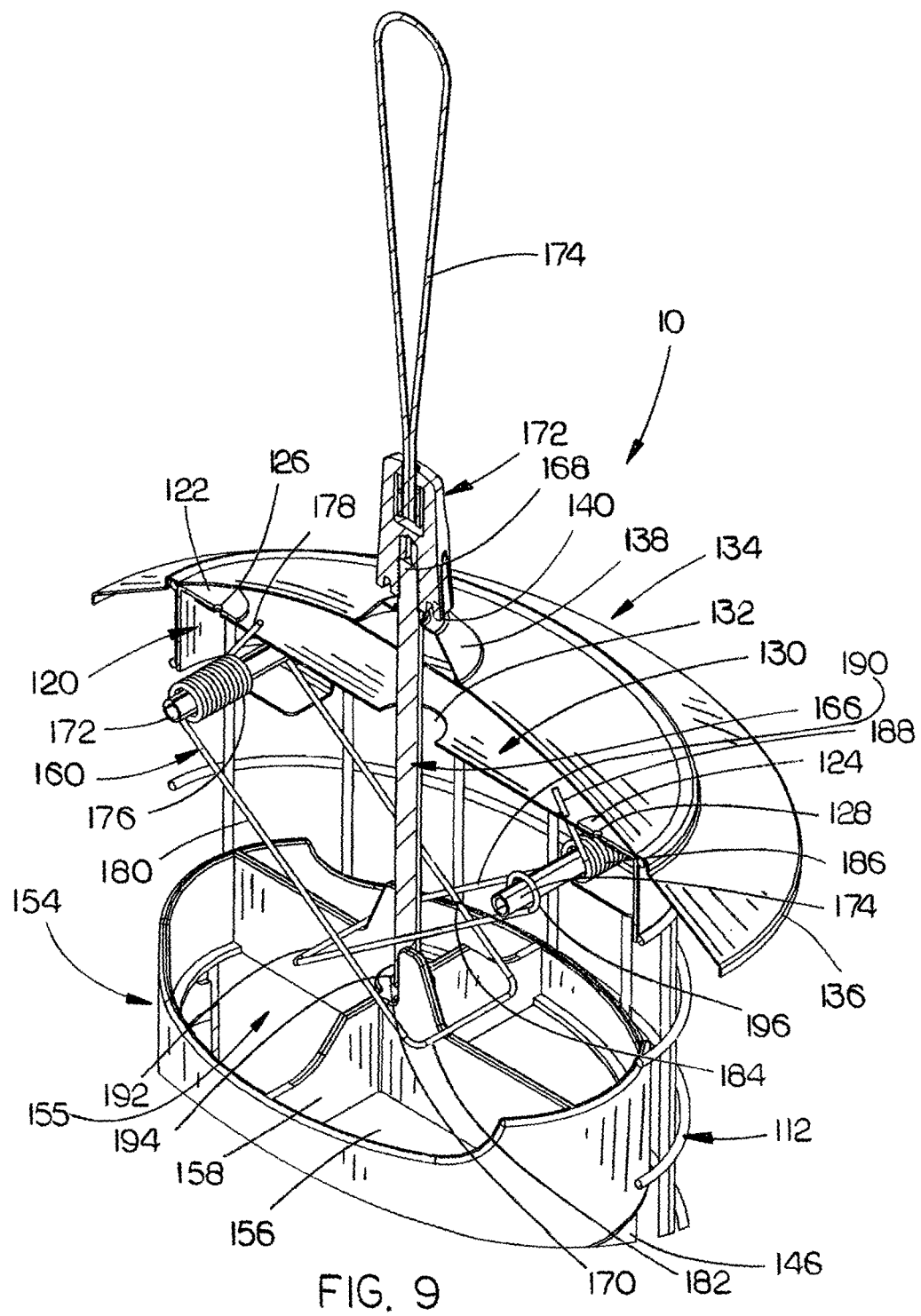
FIG. 9 is a partial upper perspective view of the bird feeder of FIG. 7 with portions thereof cut-away to more fully illustrate the invention with the shroud thereof being in its upper position with respect to the feed container thereof.
Figure 10:
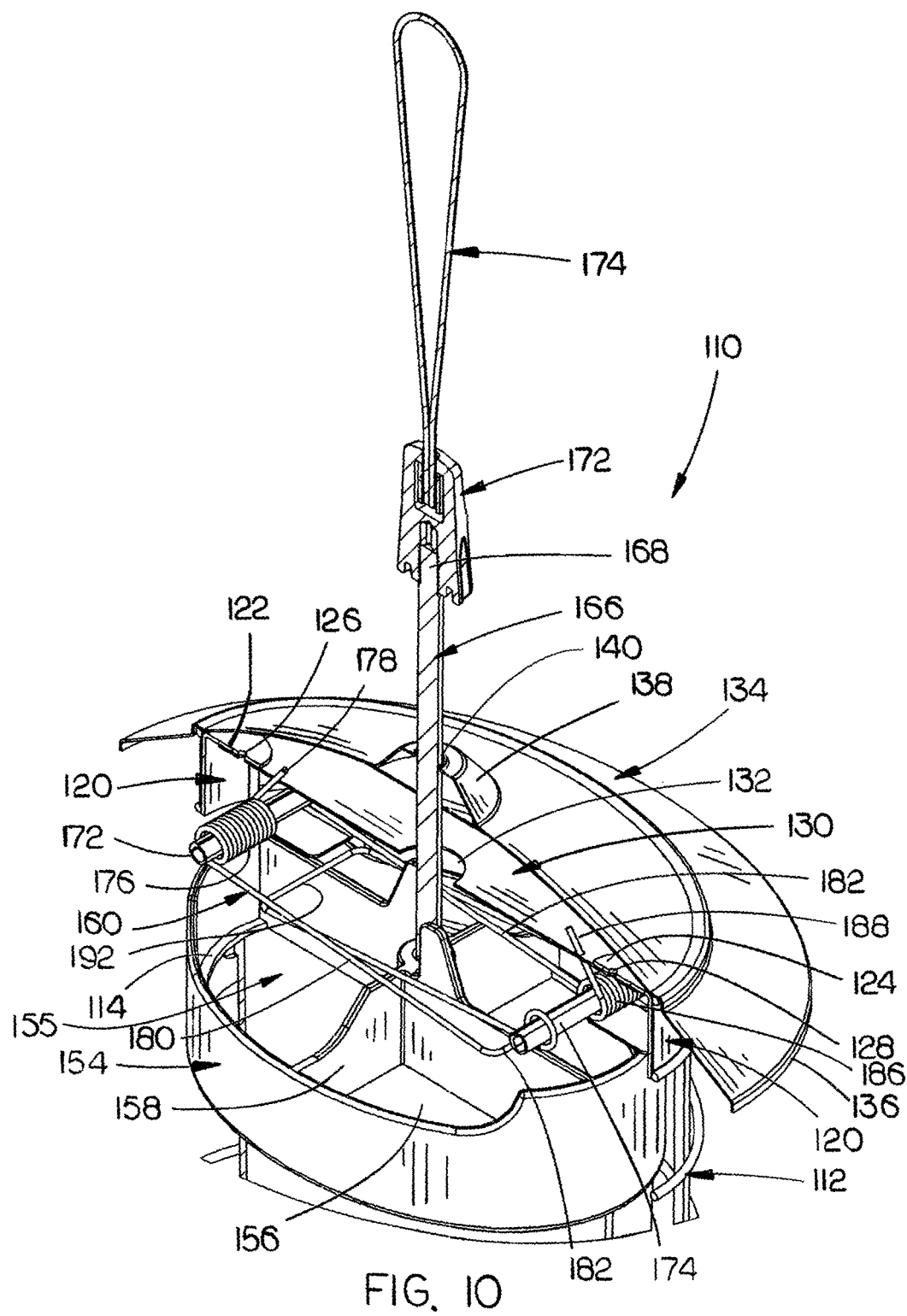
FIG. 10 is a partial upper perspective view of the bird feeder of FIG. 7 with portions thereof cut-away to more fully illustrate the invention with the shroud thereof being in its lower position with respect to the feed container thereof.
Figure 11:
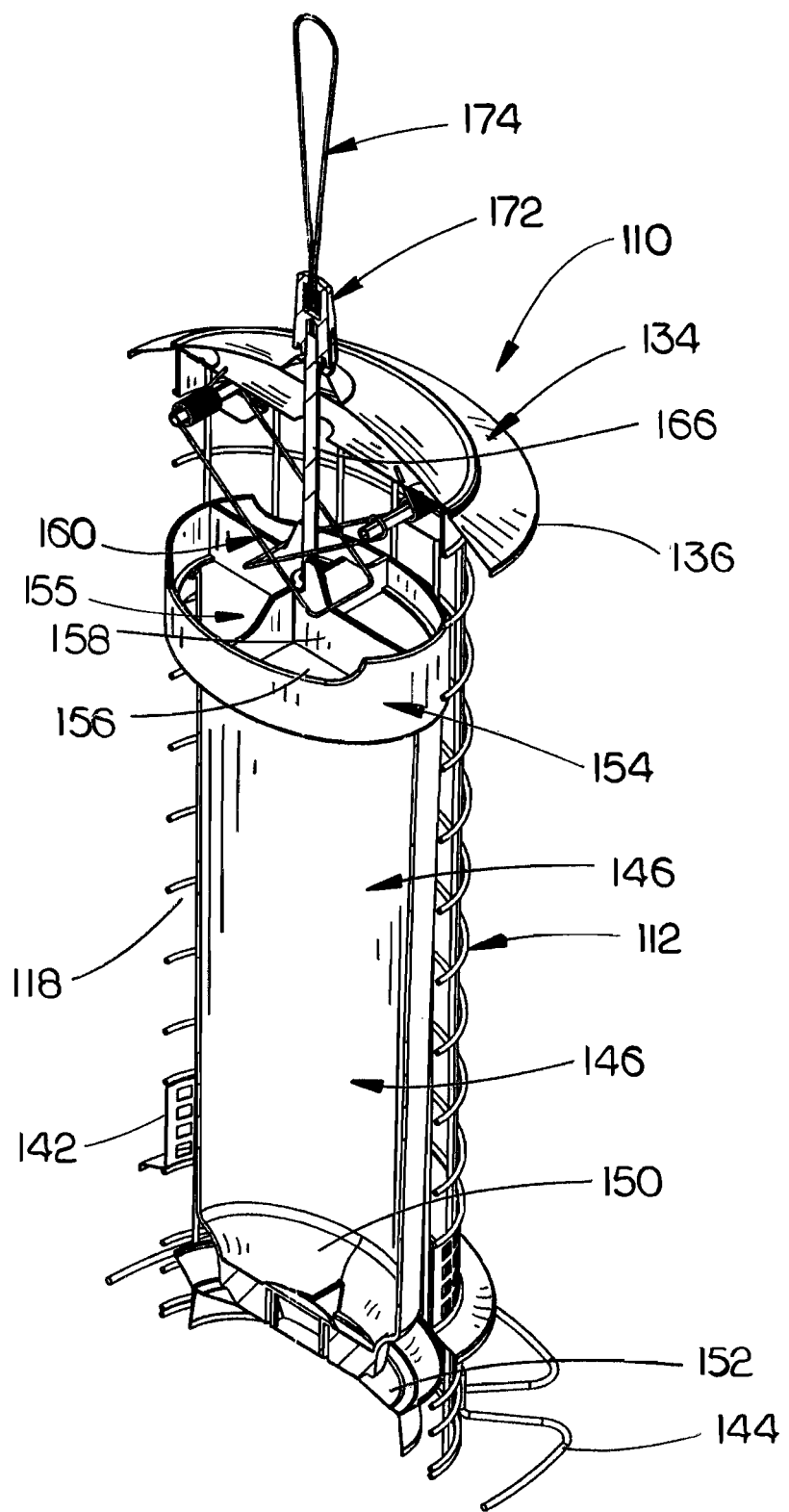
FIG. 11 is a partial perspective view of the bird feeder of FIG. 7 with portions thereof being cut-away to more fully illustrate the invention with the shroud thereof being in its upper position with respect to the feed container thereof.
Figure 12:
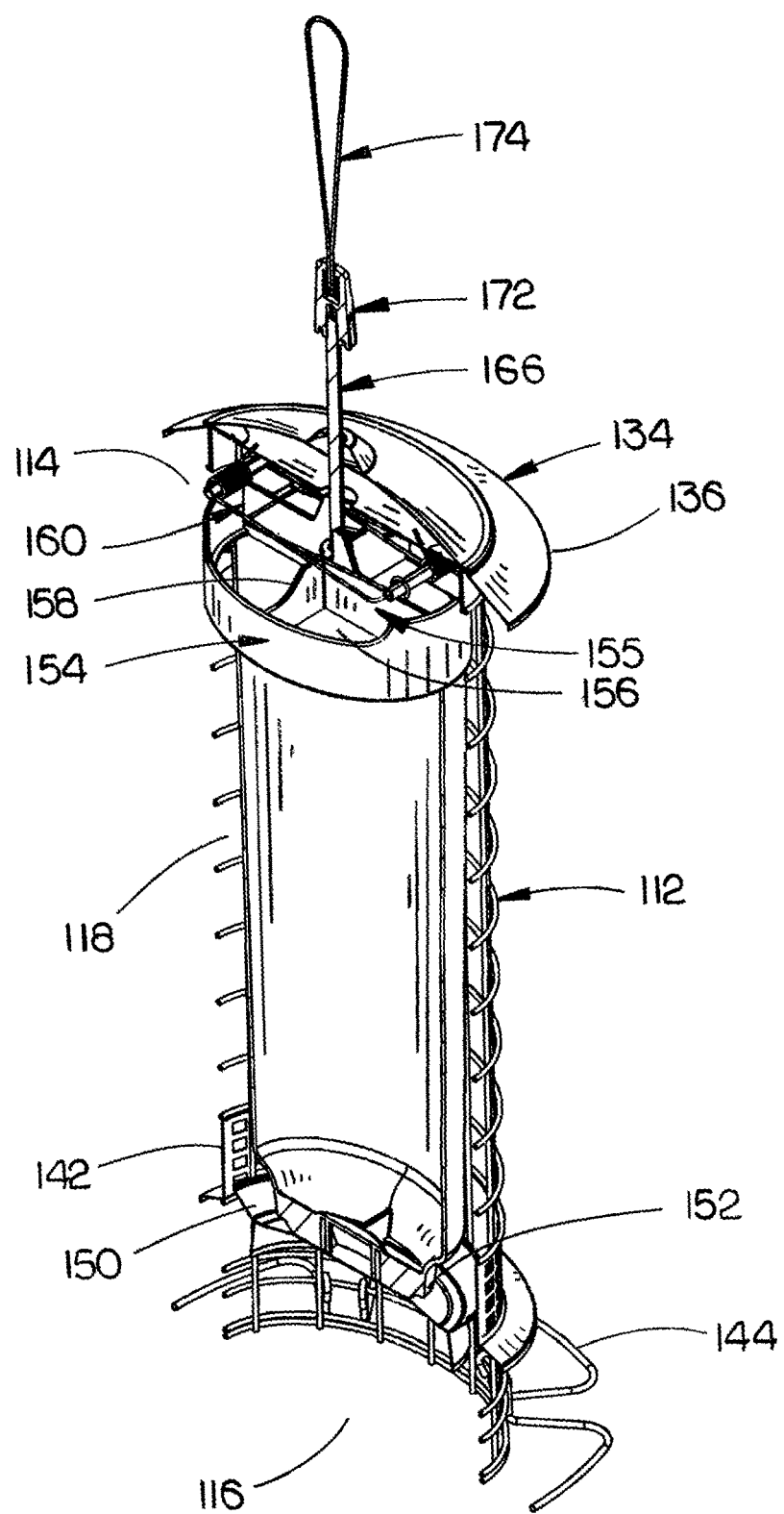
FIG. 12 is a partial perspective view of the bird feeder of FIG. 7 with portions thereof being cut-away to more fully illustrate the invention with the shroud thereof being in its lower position with respect to the feed container thereof.
Figure 13:
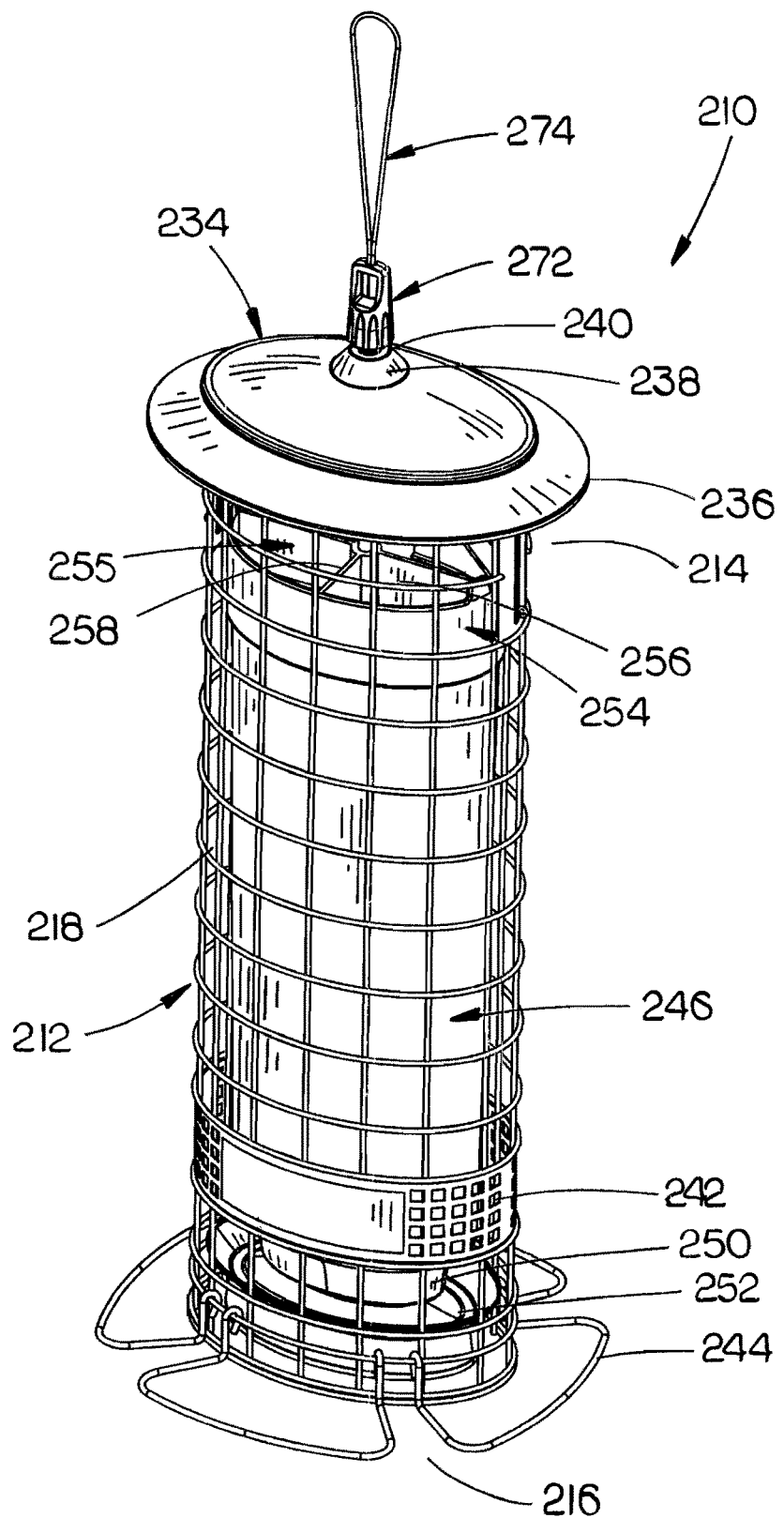
FIG. 13 is a perspective view of the third embodiment of the bird feeder of this invention with the shroud thereof being in its upper position with respect to the feed container thereof so that birds have access to the feed in the feed tray at the lower end of the feed container of the feeder.
Figure 14:
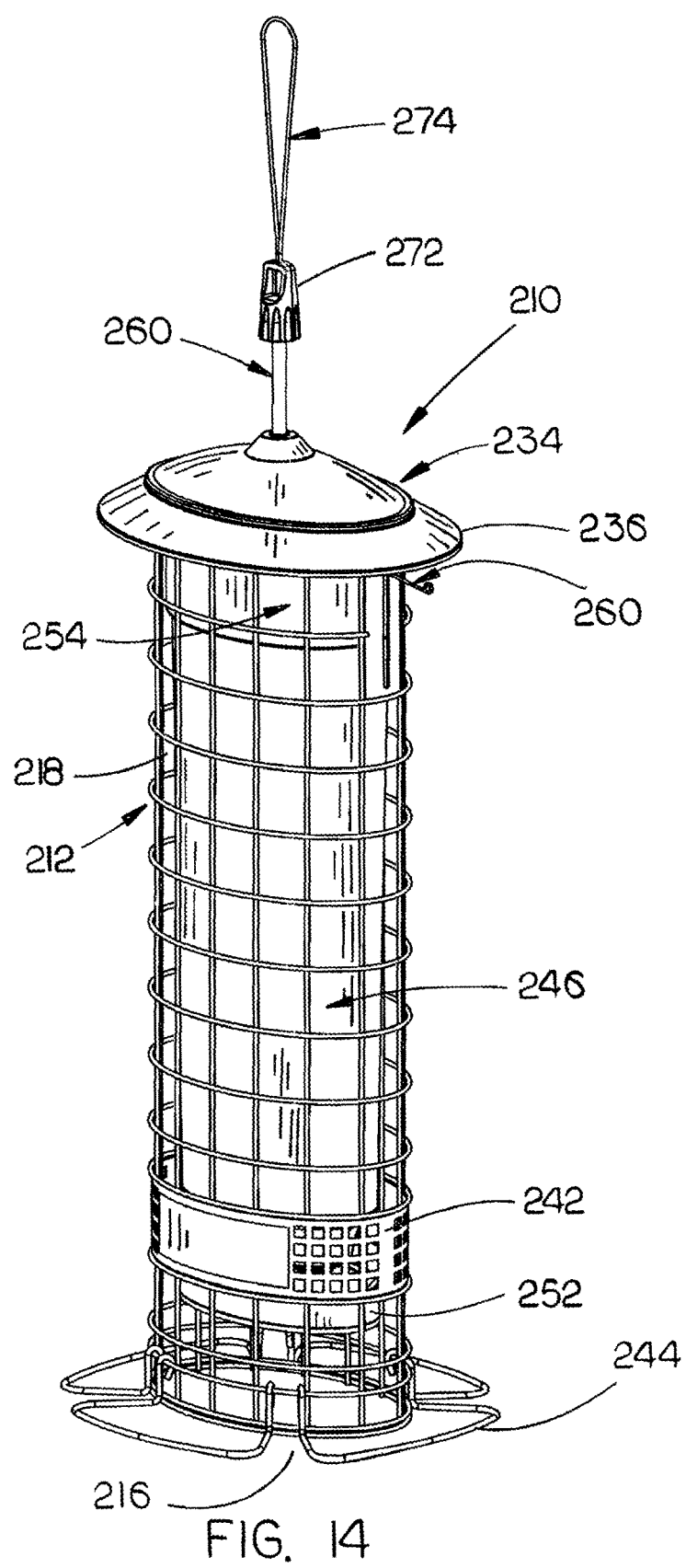
FIG. 14 is a perspective view of the bird feeder of FIG. 13 wherein the shroud thereof has been lowered with respect to the feed container thereof to shield the feed tray thereof so that large birds or squirrels are denied access to the feed in the feed tray.
Figure 15:
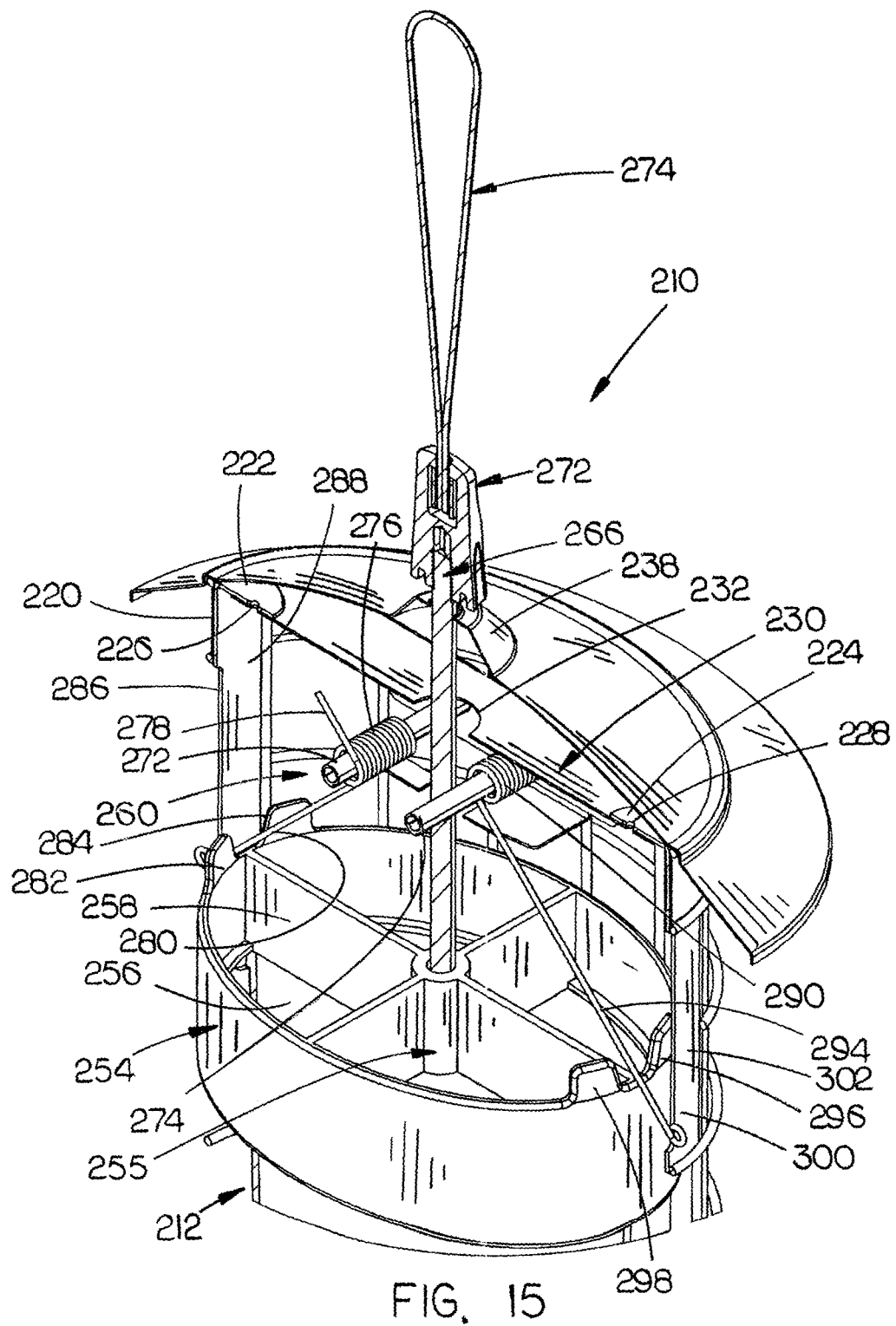
FIG. 15 is a partial upper perspective view of the bird feeder of FIG. 13 with portions thereof cut-away to more fully illustrate the invention with the shroud thereof being in its upper position with respect to the feed container thereof.
Figure 16:
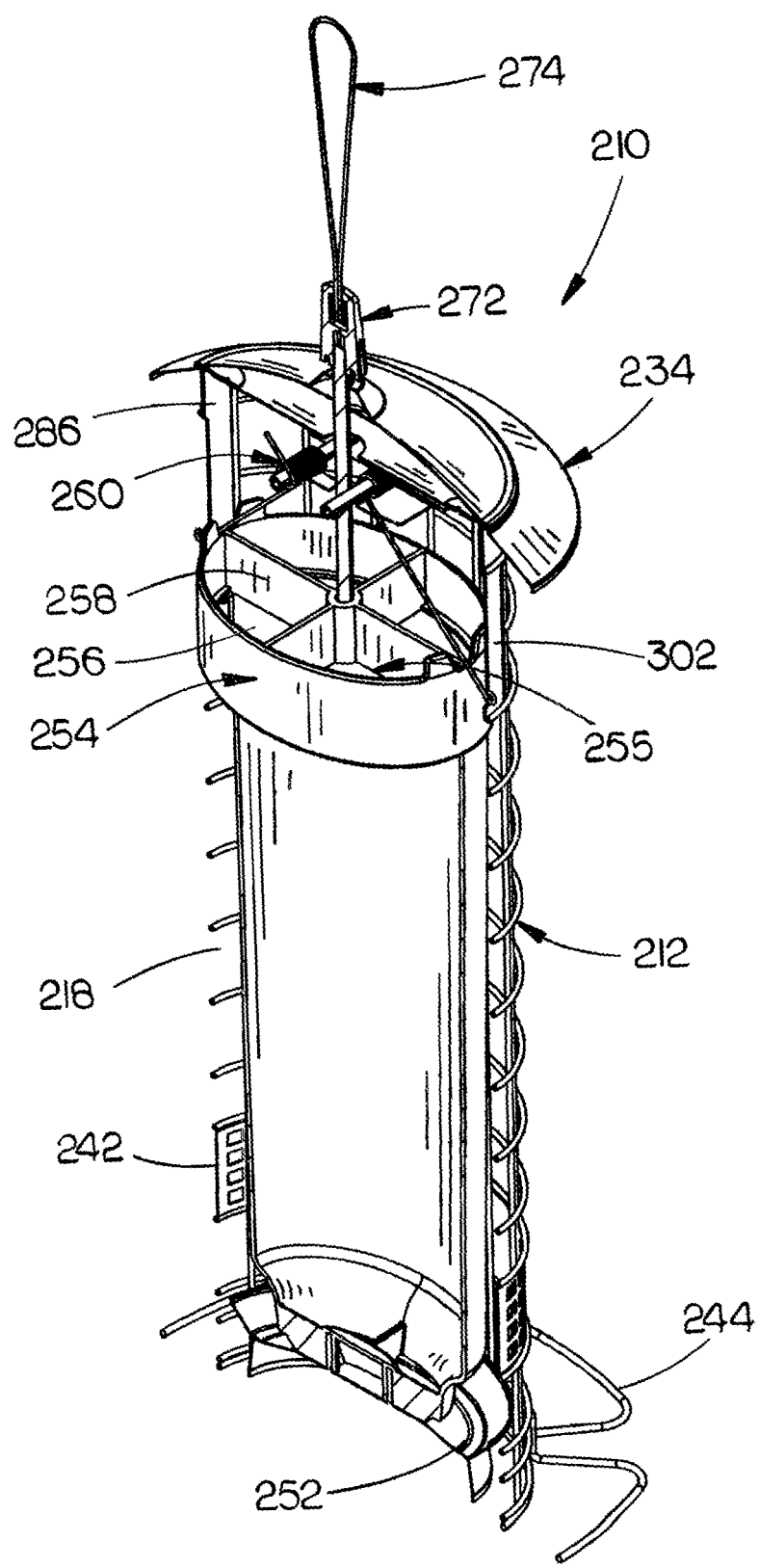
FIG. 16 is a partial upper perspective view of the bird feeder of FIG. 13 with portions thereof cut-away to more fully illustrate the invention with the shroud thereof being in its lower position with respect to the feed container thereof.
Figure 17:
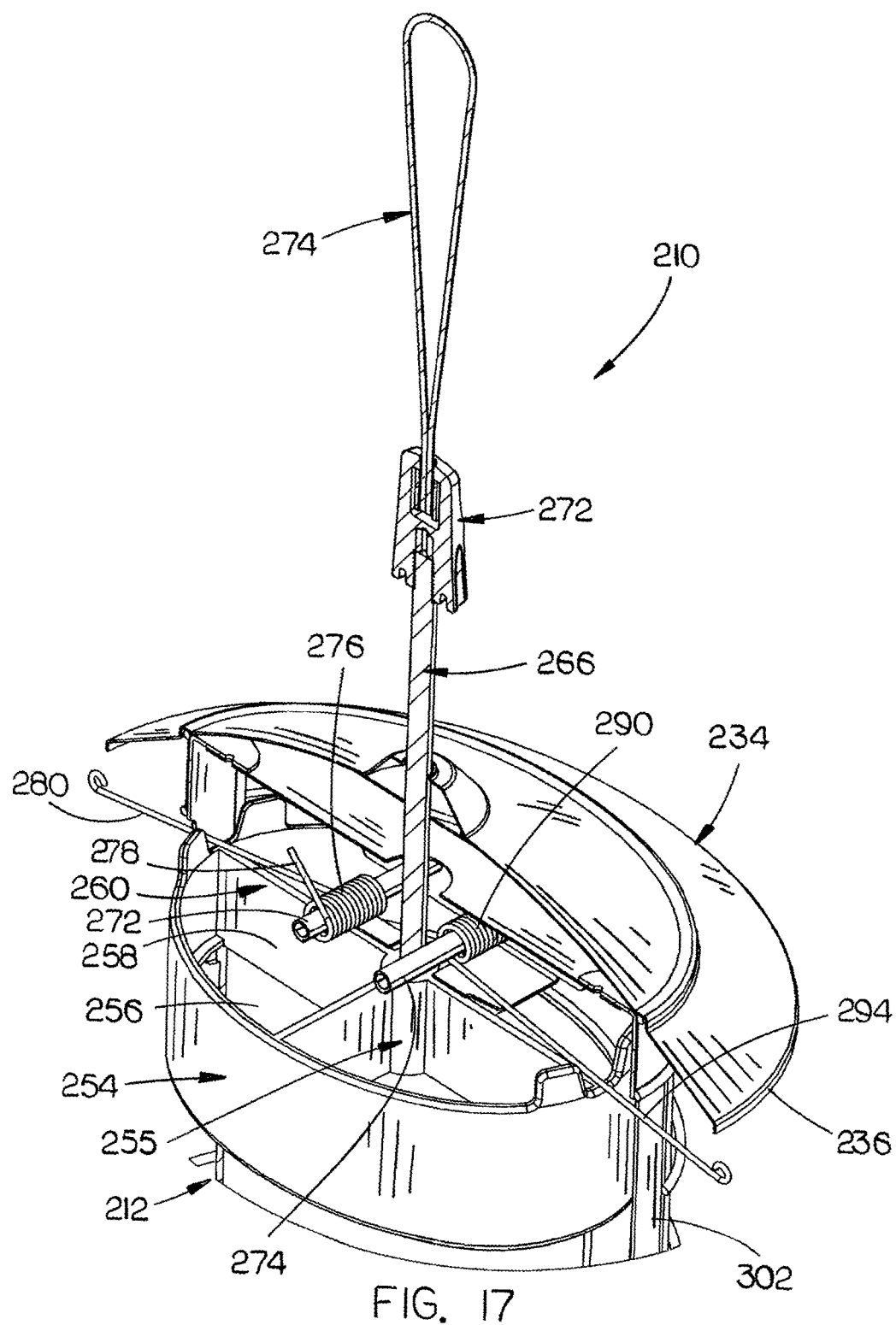
FIG. 17 is a partial perspective view of the bird feeder of FIG. 13 with portions thereof being cut-away to more fully illustrate the invention with the shroud thereof being in its upper position with respect to the feed container thereof.
Figure 18:
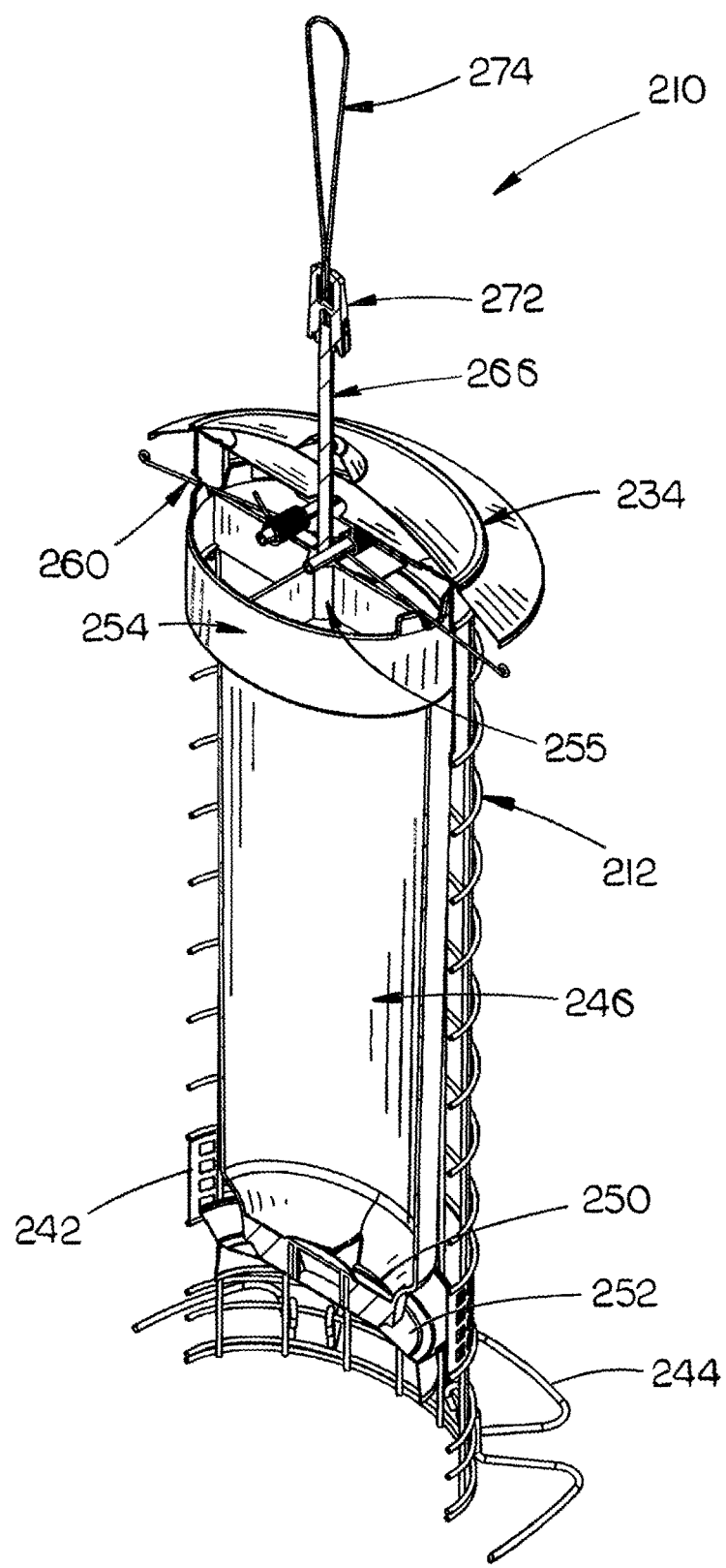
FIG. 18 is a partial perspective view of the bird feeder of FIG. 13 with portions thereof being cut-away to more fully illustrate the invention with the shroud thereof being in its lower position with respect to the feed container thereof.

The construction of spring assembly 160 will now be described. A pair of horizontally disposed pins, shafts or rods 172 and 174 are attached to the plate 130 so as to be positioned below plate 130. If the cover 134 is flat and the plate 130 is omitted, the pins 172 and 174 will be operatively secured to the underside of the cover 134. A coil spring portion 176 embraces pin 172 with end 178 thereof extending upwardly through plate 130 so as to be anchored thereto. Leg portion 180 extends from the other end of coil spring portion. Leg portion 182 extends transversely from leg portion 180 as seen in FIG. 9. Leg portion 184 extends from leg portion 182 and has its free end wrapped around pin 172.

Coil spring portion 186 embraces pin 174 with end 188 thereof extending upwardly through plate 130 so as to be anchored thereto. Leg portion 190 extends from the other end of coil spring portion 186. Leg portion 192 extends transversely from leg portion 190. Leg portion 194 extends from leg portion 192 and has its free end 196 wrapped around pin 172. As seen in FIG. 9, leg portion 182 slidably engages the upper end of a shoulder 158 of feed inlet structure 155. As also seen in FIG. 9, leg portion 192 slidably engages the upper end of a shoulder 158 of feed inlet structure 155.

Figure 7:
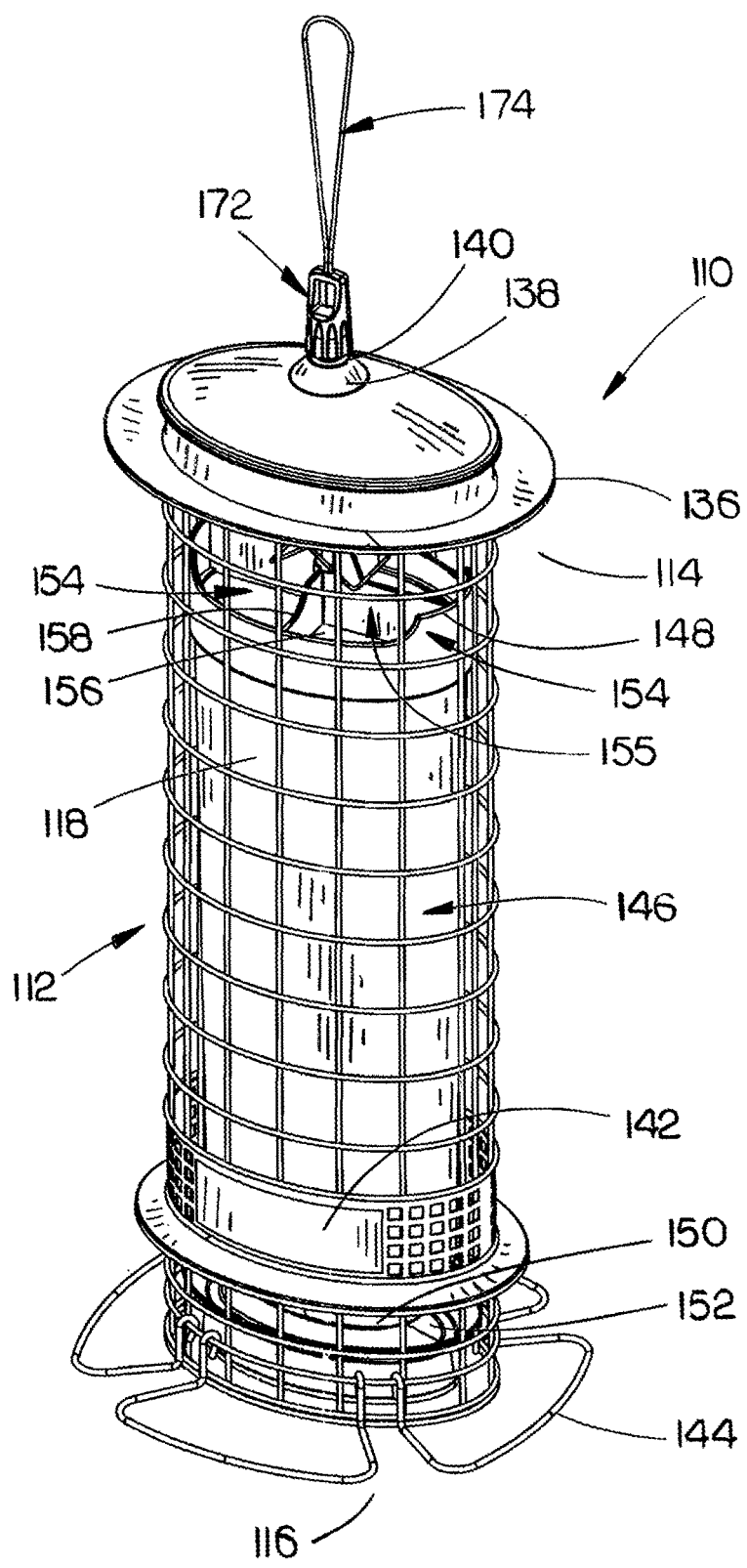
FIG. 7 is a perspective view of the second embodiment of the bird feeder of this invention with the shroud thereof being in its upper position with respect to the feed container so that birds have access to the feed in the feed tray at the lower end of the feed container of the bird feeder.
Figure 8:
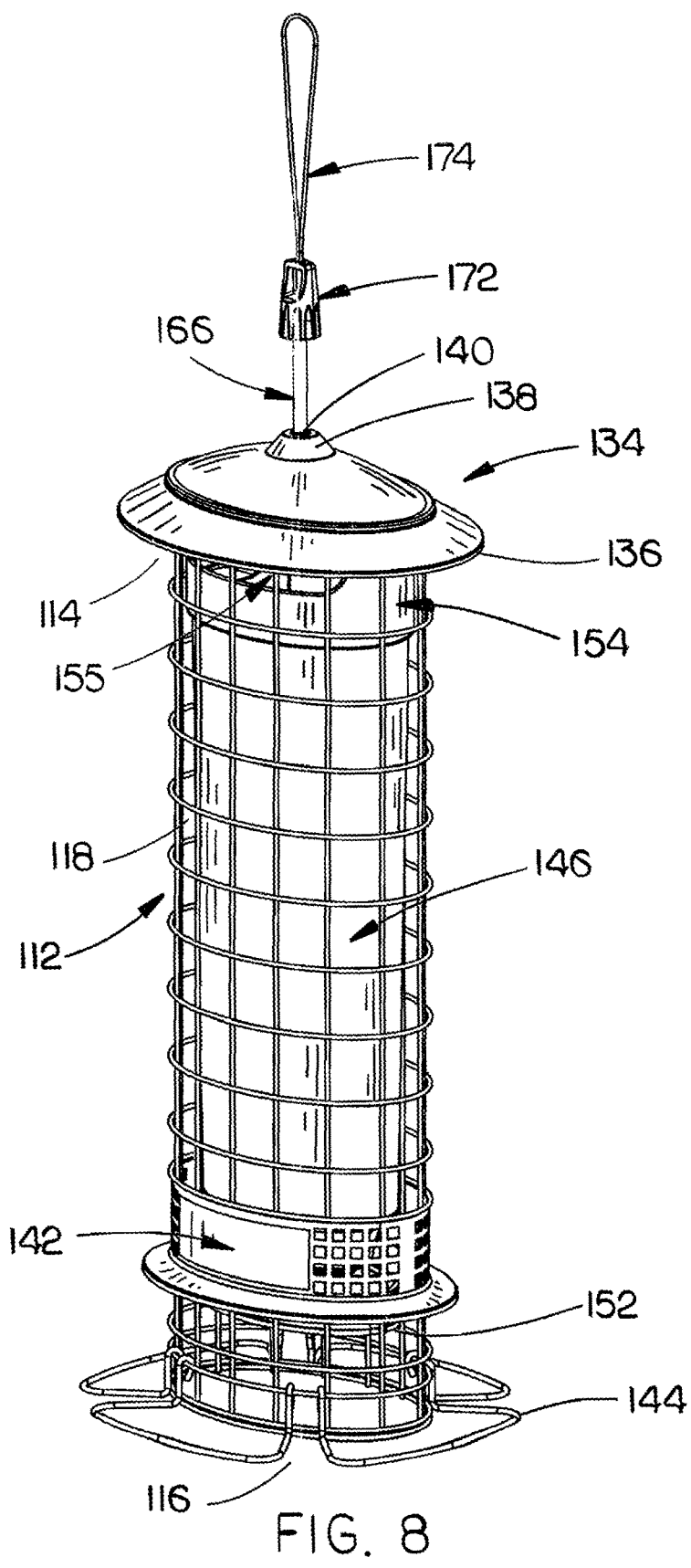
FIG. 8 is a perspective view of the bird feeder of FIG. 7 wherein the shroud thereof has been lowered to shield the feed tray thereof so that large birds or squirrels are denied access to the feed in the feed tray.

When the feeder 110 is in the upper position of FIG. 9, the spring assembly 160 yieldably urges the shroud 112 to its upper position of FIGS. 7 and 9. In that position, birds are able to feed from the feed tray 152 since the wall member 142 is positioned above the outer end of feed tray 152. If a squirrel climbs onto shroud 112 or one of the perches 144, the weight of the squirrel overcomes the resistance of the spring assembly 160 which causes the shroud 112 to move downwardly with respect to the feed container 146 which causes wall member 142 to close the access door to the feed tray 152.

The numeral 210 refers to the third embodiment of the squirrel-proof feeder of this invention. As seen in FIGS. 13-18, bird feeder 210 is essentially the same as bird feeder 10 except for the spring which yieldably maintains the shroud thereof to its upper position with respect to the feed container thereof as will be described hereinafter. Bird feeder 210 includes a vertically disposed shroud 212 having an upper end 214 and a lower end 216. Shroud 212 is comprised of a mesh material having a plurality of opening 218 formed therein. A ring-shaped wall member 220 embraces the upper end of shroud 212 and is secured thereto by welding or any other convenient means and extends therearound as seen in the drawings. The upper end of wall member 220 has a pair of tabs 222 and 224 which extend horizontally inwardly from wall member 220 and which have screw openings 226 and 228 formed therein respectively. A horizontally disposed plate 230 is secured to the undersides of tabs 222 and 224 and extends therebetween. Screws secure the ends of plate 230 to the tabs 222 and 224. Plate 230 has a central opening 232 formed therein. As stated hereinabove, plate 230 may be omitted if the cover 234 is flat.

The numeral 234 refers to a cover which is secured to the upper end 214 of shroud 212 and/or the upper end of wall member 220 by welding or the like. Cover 234 is somewhat cone-shaped and has its lower outer end 236 positioned outwardly of wall member 220, and the upper end of shroud 212 and below the upper end of wall member 220 so as to shield the upper end of the shroud 212 and the spring therein. Cover 234 has a frusto-conical shaped member 238 at its upper end with the member 238 having an opening 240 formed therein. Cover 234 may be flat as described hereinabove.

Shroud 212 has a ring-shaped wall member 242 secured thereto by welding or any other convenient means. Wall member 242 embraces shroud 212 above the lower end 216 of shroud 212. The lower end of shroud 212 has a plurality of radially spaced-apart perches 244 pivotally secured thereto. As stated above, wall member 242 may be replaced with a plurality of wires.

The numeral 246 refers to a vertically disposed and cylindrical feed container which is preferably transparent and which has an upper end 248 and an inwardly tapered open lower end 250. A ring-shaped feed tray 252 is secured to the lower end 250 of container 246. Feed tray 252 is configured to receive bird feed from the open lower end 250 of container 246 in conventional fashion. The outer end of feed tray 252 is positioned inwardly of the inside of shroud 212. As will be explained hereinafter, shroud 212 is vertically movable with respect to container 246.

A feed inlet plug 254 has an outer portion which embraces the upper end of container 246. Feed inlet plug 254 includes a feed inlet structure 255 which is positioned within the upper end of feed container 246. Feed inlet structure 255 has a plurality of feed inlet openings 256 formed therein to permit feed to pour downwardly therethrough to permit the feed container 246 to be filled with feed. Feed inlet structure 255 also has a plurality of radially spaced-apart tapered shoulders 258 extending upwardly therefrom. The numeral 260 refers to a spring assembly as will be described in more detail hereinafter. The spring assembly 260 yieldably urges shroud 212 upwardly to its upper position with respect to container 246 as will be described in more detail hereinafter. Although it is preferred that the feed inlet plug 254 is a separate component which is attached to the upper end of the feed container 246, the feed inlet structure 255 of feed inlet plug 254 could be integrally molded with feed container 246. In that case, the outer portion of feed inlet plug 254 will not be needed.

The numeral 266 refers to a vertically disposed rod having an upper end 268 and a lower end 270. The lower end 270 of rod 266 is secured to feed inlet structure 255 by any conventional means. Rod 266 extends upwardly from feed inlet structure 255, through spring assembly 260, through opening 232 in plate 230, and through opening 240 in member 238. A hanger support 272 is threadably secured to the upper end 268 of rod 266. A hanger loop 274 or other hanger device is secured to hanger support 272 for supporting the feeder 210 from some overhead supporting structure such as a tree, pole, etc. Although it is preferred that member 266 be a rod, member 266 could be a cable or other like member.

When the seed container 246 is filled with bird feed and the feeder is hung from an overhead support, the spring assembly 260 will yieldably maintain shroud 212 in its upper position with respect to container 246. When the shroud 212 is in its upper position, the wall member 242 will be positioned above the openings 218 of shroud 212 which are outwardly of the feed tray 252 so that birds may perch on the perches 244 and have access to the feed in the feed tray 252. If a squirrel moves onto the shroud 212 or the perches 244, the weight of the squirrel overcomes the upward force of spring assembly 260 which causes shroud 212 to move downwardly with respect to container 246. The downward movement of shroud 212 with respect to container 246 causes wall member 242 to be positioned outwardly of feed tray 252 thereby preventing access to the feed in the feed tray 252.

The spring assembly 260 will now be described in detail. A pair of horizontally disposed pins, shafts or rods 272 and 274 are attached or mounted to the plate 230 so as to be positioned beneath plate 230. If the cover 234 is flat and the plate 230 is omitted, the pins 272 and 274 will be operatively secured to the underside of cover 234. A coil spring portion 276 embraces pin 272 with end 278 extending upwardly to the underside of plate 230. Leg portion 280 extends downwardly from the other end of coil spring portion 276, through a pair of spaced-apart ears 280 and 284, which extend upwardly from one side of feed inlet structure 255, and through a vertically disposed slot 286 in bracket 288 which is secured to wall 220.

A coil spring portion 290 embraces pin 274 with end 292, which is identical to end 278, but not shown, extends upwardly to the underside of plate 230. Leg portion 294 extends downwardly from the other end of coil spring portion 290, through a pair of ears 296 and 298, which extend upwardly from feed inlet structure 255, and through a vertical disposed slot 300 in bracket 302 which is secured to wall 220.

When the seed container 246 is filled with bird feed and the feeder is hung from an overhead support, the spring assembly 260 will yieldably maintain shroud 212 in its upper position with respect to container 246. When the shroud 212 is in its upper position, the wall member 242 will be positioned above the openings 218 of shroud 212 which are outwardly of the feed tray 252 so that birds may perch on the perches 244 and have access to the feed in the feed tray 252. If a squirrel moves onto the shroud 212 or the perches 244, the weight of the squirrel overcomes the upward force of spring assembly 260 which causes shroud 212 to move downwardly with respect to container 246. The downward movement of shroud 212 with respect to container 246 causes wall member 242 to be positioned outwardly of feed tray 252 thereby preventing the squirrel's access to the feed in the feed tray 252.

As stated above, although the three embodiments utilize plates 30, 130, and 230, those plates may not be used if the covers 34, 134 and 234 are flat. For example, if plate 30 is not utilized in feeder 10, the upper end of the spring 60 would engage the underside of cover 30. If plate 130 is not utilized in the embodiment of FIGS. 7-12, the pins 172 and 174 would be secured to the underside of cover 134. If plate 230 is not utilized in the embodiment of FIGS. 13-18, the pins 272 and 274 would be secured to the underside of cover 234.

It should also be noted that it is preferred that the feed inlet structures 55, 155 and 255 be integrally formed with feed containers 46, 146 and 246 respectively.

Thus it can be seen that three different embodiments of the bird feeder of this invention has been provided. In each of the embodiments, the cover on the shroud partially shields the spring associated therewith from inclement weather.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A squirrel resistant bird feeder, comprising:
   a vertically disposed and hollow cylindrical feed container having an open upper end and an open lower end;
   a feed tray mounted to said feed container at said lower end thereof which is configured to receive feed from said feed container;
   said feed container having a feed inlet structure at its upper end which has an upper side;
   said feed inlet structure having a plurality of feed openings formed therein which are configured to permit feed to pass downwardly therethrough into said feed container;
   said feed inlet structure having a plurality of radially spaced-apart tapered shoulders extending upwardly therefrom;
   a vertically disposed hanger member having upper and lower ends;
   said lower end of said hanger member being secured to said feed inlet structure;
   said hanger member extending vertically upwardly from said feed inlet structure and said feed container;
   an elongated and vertically disposed cylindrical mesh shroud having an upper end and a lower end;
   said shroud having a feed tray blocking member secured to and extending around said shroud above said lower end of said shroud;
   said shroud enclosing said feed container and said feed tray;
   said shroud having a plurality of perches secured thereto at its said lower end;
   a cover fixedly secured to said upper end of said shroud;
   said cover having an upper side and a lower side;
   said cover including an outer end which has a diameter greater than the diameter of said shroud;
   said cover having a central opening formed therein;
   said hanger member extending upwardly through said central opening in said cover whereby said upper end of said hanger member is positioned above said cover;
   said upper end of said hanger member being configured to be operatively secured to an overhead support;
   said shroud being vertically movable between an upper position and a lower position with respect to said feed container;
   a coil spring having a movable upper end and a stationary lower end;
   said coil spring being positioned between said feed inlet structure and said lower side of said cover;
   said lower end of said coil spring extending around said tapered shoulders of said feed inlet structure and being in direct engagement therewith;
   said upper end of said coil spring being in operative engagement with said lower side of said cover;
   said coil spring yieldably maintaining said shroud in its said upper position;
   said shroud being movable from its said upper position to its said lower position upon a squirrel climbing onto said shroud or said perches whereby said upper end of said coil spring is compressed downwardly towards said stationary lower end of said coil spring; and
   said feed tray blocking member being positioned outwardly of said feed tray, when said shroud is in said lower position, to deny access to said feed tray.

* * * * *